United States Patent [19]

Chastain

[11] Patent Number: 5,682,707
[45] Date of Patent: Nov. 4, 1997

[54] AGRICULTURAL BURNER IMPLEMENT

[76] Inventor: Julius H. Chastain, Rte. 2, Box 22, Pavo, Ga. 31778

[21] Appl. No.: 384,337
[22] Filed: Feb. 1, 1995
[51] Int. Cl.$^6$ .................................................. A01M 15/00
[52] U.S. Cl. ............................................................ 47/1.44
[58] Field of Search ............................................ 47/1.44

[56] References Cited

U.S. PATENT DOCUMENTS

| | | |
|---|---|---|
| 1,851,379 | 3/1932 | Worthley . |
| 2,601,895 | 12/1952 | Garretson et al. . |
| 2,899,776 | 8/1959 | Arnold . |
| 3,164,927 | 1/1965 | Holloway ................................ 47/1.44 |
| 3,477,174 | 11/1969 | Lalor . |
| 3,805,766 | 4/1974 | Hammon ................................ 47/1.44 |
| 5,030,086 | 7/1991 | Jones . |
| 5,189,832 | 3/1993 | Hoek et al. ........................... 47/1.44 |
| 5,430,970 | 7/1995 | Thompson et al. ................... 47/1.44 |

FOREIGN PATENT DOCUMENTS

| | | | |
|---|---|---|---|
| 2235637 | 3/1975 | France ................................... 47/1.44 |
| 8303505 | 5/1985 | Netherlands .......................... 47/1.44 |
| 240387 | 8/1969 | U.S.S.R. ................................ 47/1.44 |

*Primary Examiner*—Terry Lee Melius
*Assistant Examiner*—Joanne C. Downs
*Attorney, Agent, or Firm*—Dowell & Dowell

[57] ABSTRACT

An agricultural implement for controlling weeds, insects and other harmful organisms in the soil along plant rows and in the furrows between plant rows which includes a plurality of burner units which are mounted to a tool bar. Each burner unit includes a carriage having a housing mounted thereon in which is positioned a first burner for directing flame and heat to the area of the furrows. In a preferred embodiment, second and third burner units are mounted on the carriages which are directed outwardly from the sides of the carriages toward adjacent crop rows. Heat from the burner units is trapped beneath the carriages and exhausted rearwardly thereof.

20 Claims, 6 Drawing Sheets

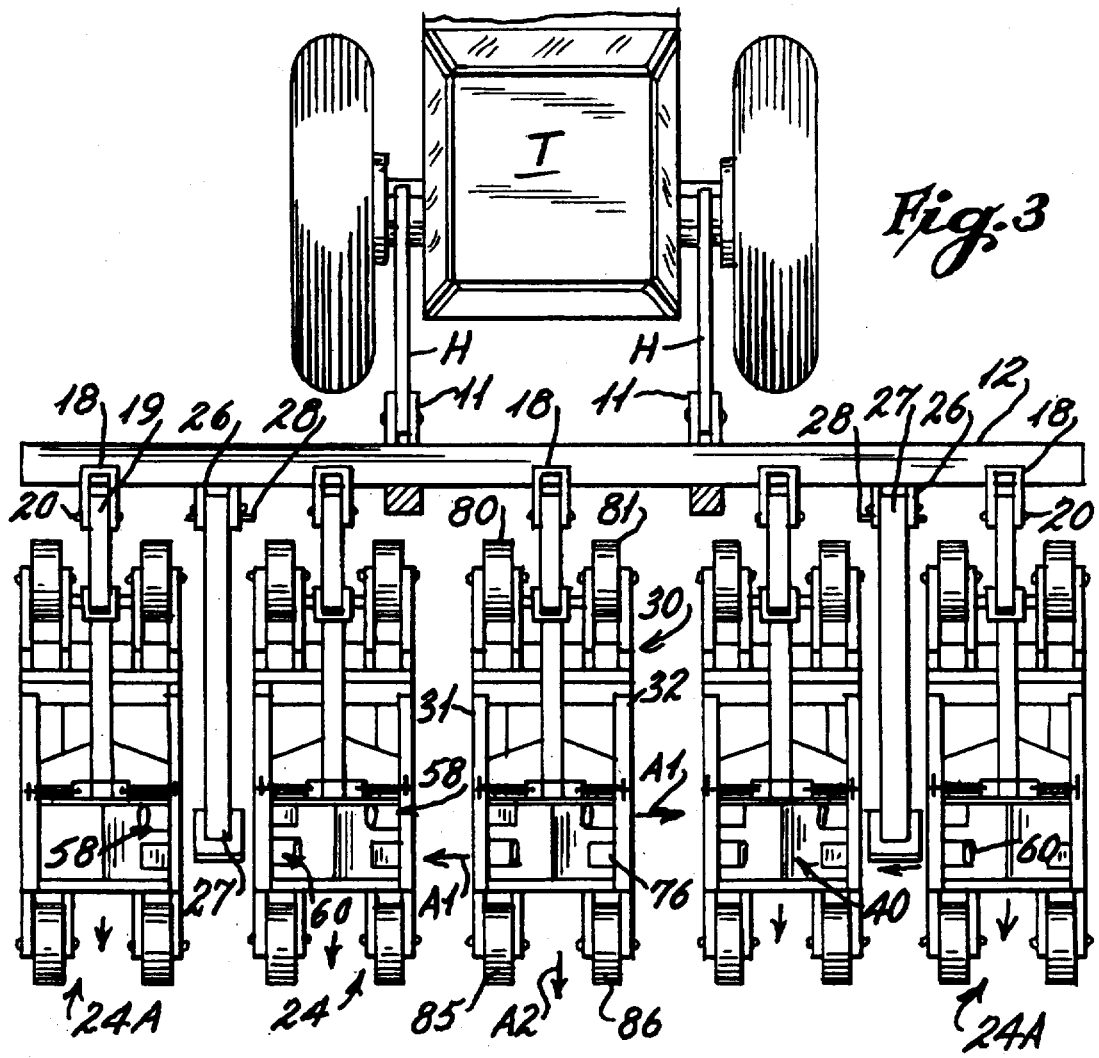
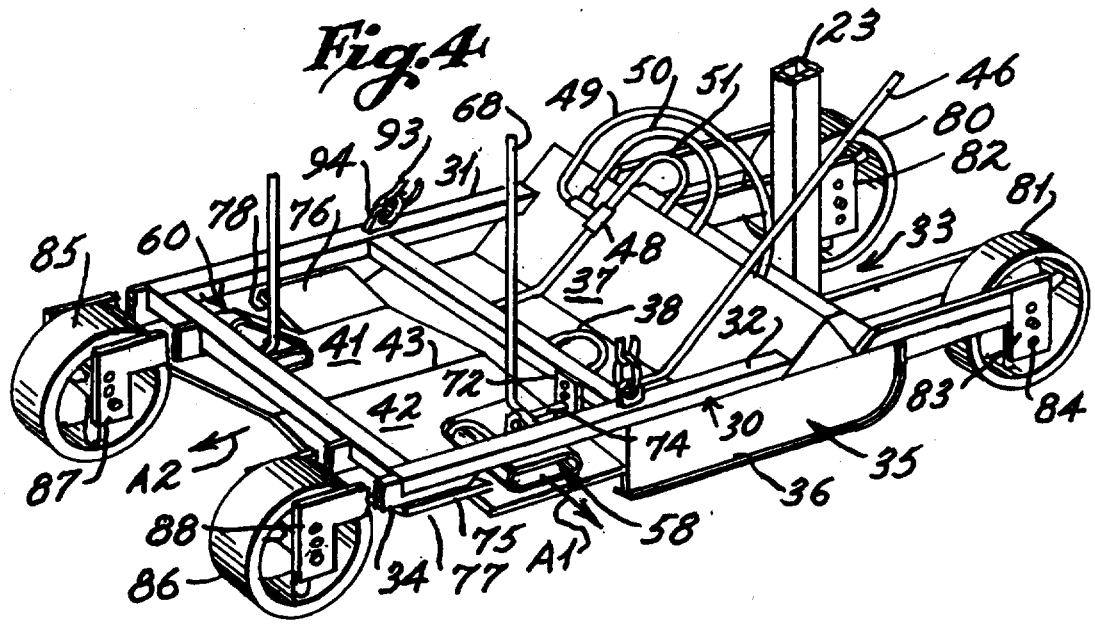

AGRICULTURAL BURNER IMPLEMENT

BACKGROUND OF THE INVENTION

1. Field of the Invention

This invention is generally directed to agricultural implements and more particularly to multi-row burners of the type which are moved by a tractor through a field so as to direct flame and heat to the furrows between crop rows as well as to the base of plants in the adjacent crop rows to thereby destroy weeds, insects and micro-organisms which are present. In one embodiment, the implement is designed to also destroy vegetation along the crop rows.

2. History of the Related Art

There is an ever growing awareness that immediate action must be taken to prevent damage to the environment caused by the use of toxic chemical herbicides, pesticides, insecticides and the like which are used to control weed growth and prevent insect and bio-organism infestation of agriculture plants. The use of toxic chemicals has resulted in contamination of both surface and subsurface water supplies. In addition, the use of toxic chemicals for insect and weed control in the farming industry has resulted in various toxins finding their way into the natural food supply of fish, bird and animal life. In some instances, these toxins have been found in supplies of fish, fowl and meat intended for human consumption.

In view of the foregoing, there is an ever increasing need to find alternative methods for controlling weeds and insects in the farming industry. Over the years, there has been some use made of liquified petroleum gas burners for destroying weeds and insect life through the application of heat. In U.S. Pat. No. 3,477,174 to Lalor an apparatus for flame cultivating row crops is disclosed. The apparatus is designed to be maneuvered by a tractor or other vehicle and includes a tool bar frame to which is mounted a blower system which includes a plurality of ducts designed to provide a source of air supply on opposite sides of each plant row so that a curtain of air is applied just below the lowest leaves of the plants. An exhaust duct system is also provided for receiving hot air and for discharging it upwardly and outwardly relative to the apparatus. In order to destroy unwanted weeds and insects, a plurality of burners are mounted in spaced relationship on the tool bar frame. Generally, three burner units are provided just forwardly and below the air blower duct assembly. Two of the burners are oriented outwardly and rearwardly so as to direct a flame toward the base of plants growing in adjacent crop rows while an intermediate burner unit is oriented to provide a flame in the area of the furrow between the plant rows. A plate extends horizontally over the furrows to channel hot air rearwardly toward the exhaust duct which draws the air upwardly and outwardly with respect to the plant rows. In use, the burners which are oriented toward the plant rows direct flame toward the base of the plants with the flames being deflected by the air curtain created by the blowers.

Unfortunately, this type of burner implement is not adequate for use in many agriculture areas not only due to the cost of the implement and its complexity, but also because such implements are not sufficiently adjustable to allow accurate flame cultivation. Also, the use of high powered blowers on agriculture implements results in dirt and other particulate material being introduced into the air which creates an unhealthy environment for the vehicle operator as well as for others who may be working in or near a field being treated.

Another problem inherent in burner implements such as disclosed in the patent to Lalor are that the implements are designed to track within the furrows between the crop rows. Often furrows are washed out or irregular in both height and depth. Therefore, as an implement tracks between the crop rows the orientation of the burners relative to the plants varies and there is no control with respect to properly directing the flames toward the base of the plants, often resulting in crop damage.

A simplified burner implement for use in agriculture is disclosed in U.S. Pat. No. 5,030,086 to Jones. The implement disclosed in this patent utilizes pairs of nozzles to direct flames produced from the combustion of liquid propane to opposite sides of the plant rows. Each burner nozzle is mounted on a standard which is connected to a rearwardly mounted secondary tool bar connected to the main tow bar of a vehicle such as a tractor. The rearwardly directed tool bars are provided with grounding engaging skids or shoes which track along the furrows between the crop rows. As with the prior burner implement disclosed in Lalor, with the Jones implement, the relative alignment of the burner nozzles with respect to the base of the plants in the crop rows is subject to the movement of the tool bars by the ground engaging shoes. As furrows are irregular, often the direction of the flames is inconsistent and either weeds and insects are not destroyed or the plants may be damaged by the flames being misdirected and burning foliage above the base of the plants. In addition, the implement of Jones does not provide for the destruction of weeds, insects and micro-organisms in the area of the furrows and thus separate treatment of the furrow area is necessary. This results in a duplication of effort by the farmer to properly treat a given field.

In addition to the flame cultivation of fields, there is often a need to destroy plant vegetation prior to or after crop harvesting. By way of example, prior to harvesting many potato crops, it is desirable to destroy the plant vines. In such situations, burner units must be operable to apply flame and heat to both the plant rows and the furrows therebetween. Burner implements, however, have previously not been constructed to provide such a capability.

Some additional examples of prior art burner implements are disclosed in U.S. Pat. No. 1,851,379 to Worthley, U.S. Pat. No. 2,601,895 to Garretson et al., and U.S. Pat. No. 2,899,776 to Arnold.

SUMMARY OF THE INVENTION

The present invention is directed to agricultural burner implements for controlling weeds, insects, micro-organism and other adverse elements in both the furrows and along spaced crop rows in which plants are growing and which includes a plurality of spaced burner units which are mounted by suitable linkage mechanisms to a tool bar which may be maneuvered by a tractor or other vehicle. Each of the burner units includes a carriage including a frame having opposite side and front and rear portions. A housing is mounted on the carriage and is of at least a size to extend over a furrow between adjacent crop rows. A first burner is mounted within the housing and includes one or more nozzles for directing a flame to the area of a furrow. A hood extends rearwardly from the housing and an air intake is preferably provided between the housing and hood along the upper portion of the carriages so as to insure both adequate oxygen supply to support combustion and to insure all flames and heat are conveyed rearwardly of the carriages. In some embodiments, a liquified petroleum or propane gas supply is also mounted from the tool bar and is connected to the first burner by way of one or more fuel lines which include a coiled portion which is mounted in heat exchange contact with the outer surface of the housing prior to being connected to the nozzles of the first burner.

In one embodiment, each of the burner units also includes a second burner which is mounted adjacent one of the sides of the carriage which is oriented outwardly toward an adjacent crop row so as to direct a flame to the base of plants growing along the crop row. A hood is mounted rearwardly of the housing over which the second burner is mounted. The hood includes a deflector which extends outwardly above an opening in the hood which is spaced adjacent to the second burner.

Most of the burner units also include a third burner which is oriented on an opposite side of the carriage from the second burner and is also oriented toward the base of the plants of an adjacent crop row. A second deflector plate extends from the side of the carriage adjacent the third burner and defines a second side opening. The first and second side openings are arranged so as to be directly opposite the third and second burners of an adjacent carriage, respectively. In this manner, the flames from the second and third burners which are directed toward the base of the plants, direct the heat toward the opening beneath the hood of an adjacent burner unit so that excess heat is trapped beneath the hood of the adjacent burner unit until being discharged rearwardly of the burner unit as the implement moves through a field. In this manner, not only is the heat from the first burner nozzles retained beneath the housing and then beneath the hood of each carriage but the excess heat from an adjacent side mounted burner nozzle is also captured beneath the hood of an adjacent burner so as to discharge rearwardly of each carriage as the implement is in use.

In the preferred embodiments, each carriage includes a pair of front and rear wheels which are mounted to the frame. In one embodiment the wheels are spaced so as to track along the side of the crop rows and above the base of the furrows so that the carriages closely follow the planting contour of the plants in a crop row. In this manner, the orientation of the second and third burners remains more consistent with respect to the base of the plants in the crop rows. Also, in the preferred embodiments, each carriage is allowed to float with respect to the ground surface by appropriate connection to the main tool bar.

In some embodiments where multiple row burner units are used, the burner units on the outside of each implement are provided with only a single row crop burner which is mounted on the side of the carriage adjacent another carriage. This prevents any burner being utilized which would direct flames outwardly relative to the carriage where there is no opposite carriage with a hood assembly which functions to trap the heat and direct the heat rearwardly and away from the crop rows.

It is the primary object of the present invention to provide burner implements for use in controlling weeds, insects, micro-organisms and other elements in agriculture fields wherein the implements provide for the simultaneous treatment of areas in the furrows between crop rows as well as the areas along the crop rows.

It is yet another object of the present invention to provide burner implements for use in agriculture which are less complex and more economical than prior art burners but which provide for the containment of heat being directed in the area of crop rows and which convey the heat rearwardly of the implements until the heat can be released without the possibility of damage to foliage of adjacent crops, unless such foliage is to be intentionally destroyed.

It is also an object of the present invention to provide a multi-row burner implements for use in agriculture which include a plurality of burner carriages which are mounted on wheels so as to track along the sides of the plant rows spaced from the bottom of the furrows between the plant rows to thereby cause the implement carriages and the nozzles mounted thereto to more closely follow the planting contour of the crops along the crop rows.

It is yet another object of the present invention to provide burner implements for agricultural use in controlling weeds, insects, micro-organisms and other elements simultaneously in the furrows between adjacent crop rows as well as at the base of plants along the crop rows wherein excess heat generated by both the burners over the furrows as well as those directed toward the crop rows is captured and contained in the area between the crop rows until being discharge rearwardly of the implement as the implement passes through a field.

It is also an object of the present invention to provide burner implements which can be used to simultaneously destroy weed and plant vegetation along crop rows and in the furrows between crop rows so that the harvesting of tuberous crops is facilitated.

BRIEF DESCRIPTION OF THE DRAWINGS

FIG. 3 is a view taken along 3—3 of FIG. 1 showing a plurality of burner unit carriages mounted to the tool bar which is connected to the hitch assembly of a tractor and showing the outer burner carriages modified with respect to the inner burner carriages.

FIG. 4 is an enlarged perspective view of one of the inner burner unit carriages of the present invention.

DESCRIPTION OF THE PREFERRED EMBODIMENT

Figure 1:
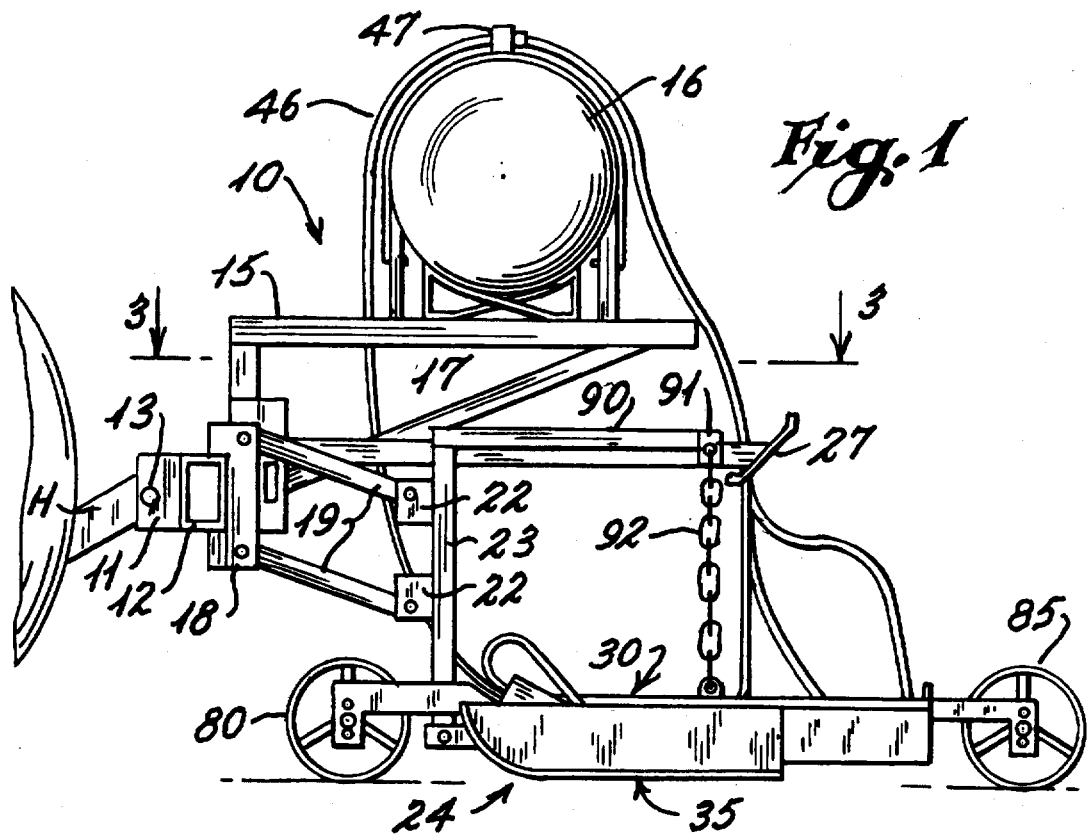
FIG. 1 is a side view of a burner implement of a first embodiment of the present invention showing a burner unit carriage mounted by a linkage mechanism to a tool bar and showing a source of LP gas mounted on a rack carried by the tool bar.
Figure 2:
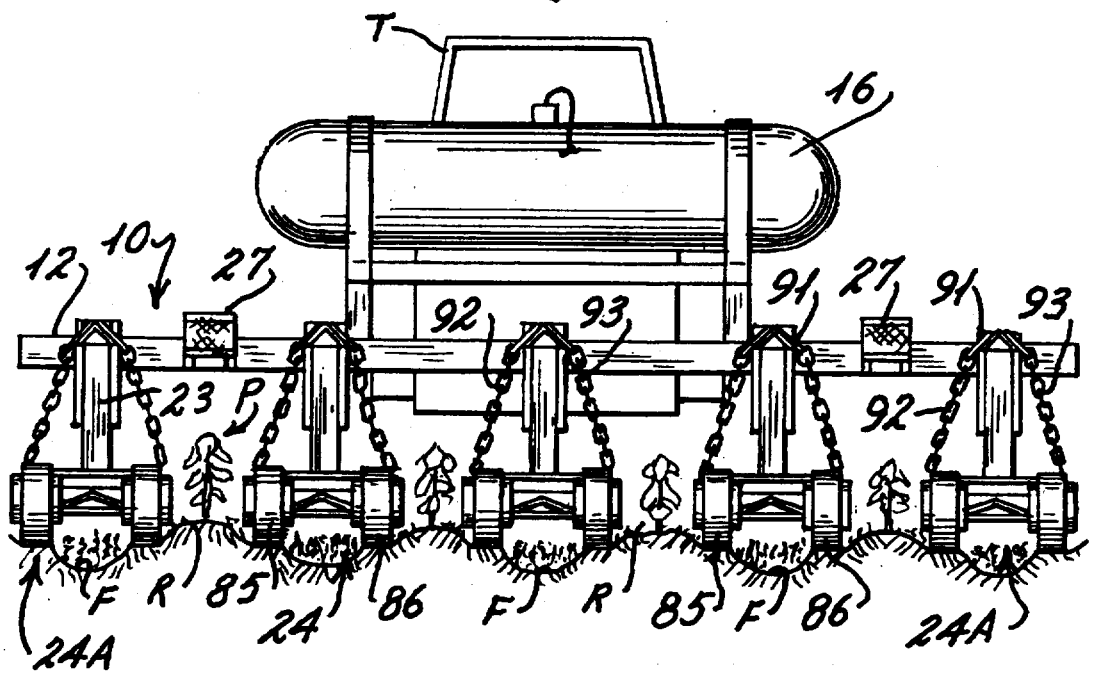
FIG. 2 is a rear view showing the plurality of burner unit carriages mounted below the fuel tank shown in FIG. 1 and showing the manner in which the carriages track along the side of the plant rows spaced from the bottom of the furrows between the plant rows.
Figure 4A:
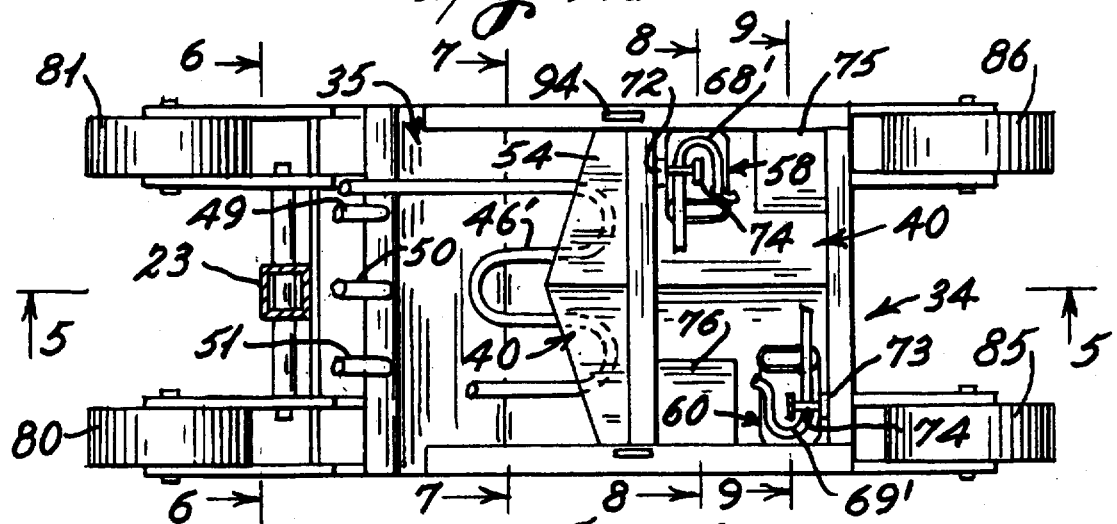
FIG. 4A is a top plan view of the burner unit carriage of FIG. 4.

With specific reference to FIGS. 1–3, a first embodiment of burner implement 10 of the present invention is shown as it is connected to the hitch assembly "H" of a tractor "T" by a pair of mounting brackets 11 which are connected to a tool bar 12. A pivot pin 13 is utilized to connect each bracket to the hitch assembly so that the implement is allowed to pivot relative to the hitch assembly.

A platform 15 is mounted above and to the tool bar 12 on which is mounted a liquid petroleum tank 16. The platform 15 is reinforced by a pair of outrigger braces 17 which extend to the tool bar. The platform and the braces 17 are preferably welded to the tool bar. Although the tank 16 is shown as being mounted to a platform which is connected to the tool bar 12, in some instances, the tank may be mounted more directly to the vehicle and therefore could be mounted to a supplemental frame extending directly from the tractor "T".

Mounted so as to extend rearwardly of the tool bar 12 are a plurality of generally elongated U-shaped mounting brackets 18. A pair of spaced generally parallel linkage members 19 are pivotably connected by pivot pins 20 to the bracket so as to be pivotable with respect thereto. The opposite ends of the linkages 19 are connected by pivot pins 21 to a pair of spaced brackets 22 which are welded or otherwise secured to a post 23 extending upwardly from a burner carriage 24.

In order to support the implement when the implement is not attached to a motor vehicle, a pair of secondary U-shaped brackets 26 are mounted to the tool bar 12 to which are pivotably mounted a pair of stands 27. When the implement is in use, the stands are raised to a generally horizontal position and secured by locking pins 28 which extend through the brackets and through an aligned opening in the stands. When the implement is not in use, the locking pin 28 is removed and the stands are allowed to pivot downwardly into vertical engagement with the ground, afterwhich the pins are used to lock the stands in position.

With specific reference to FIGS. 4–9, the burner unit carriages of the first embodiment of the present invention will be described in greater detail. As shown in FIG. 3, the outer carriages 24A are slightly modified with respect to the inner carriages in a manner as will be discussed in greater detail hereinafter to prevent damage to crop rows adjacent the sides of the implements.

Each burner unit carriage 24 includes a frame 30 having side portions 31 and 32 and front and rear portions 33 and 34. A housing 35 is mounted adjacent the front portion 33 of each carriage and includes opposite sidewalls 36 and a first upper wall portion 37 which is tapered upwardly and a second more horizontal wall portion 38 which extends rearwardly on the carriage. Mounted to the frame adjacent to the housing 35 is a hood 40 which is generally of an inverted V-shape configuration having sloping side walls 41 and 42 which depend from an upper ridge 43. In some instances, the hood may be formed integrally with the housing 35. Both the hood and the housing are preferably formed of a steel plate so as to be resistant to the high temperatures which are associated with the burners mounted to each carriage as will be described in greater detail. The housing may also include a tapering forward wall portion 39 having one or more openings 44 therein through which first burner nozzles 45 may be selectively inserted.

As shown in FIG. 4, a primary fuel supply line 46 extends from an appropriate valve assembly 47 mounted to the fuel tank 16. The fuel line 46 includes a serpentine portion 46' which is placed in heat exchange relationship against the upper surface 38 of the housing 35. The fuel line 46 is connected to a distribution valve 48 to which supplemental fuel lines 49, 50 and 51 are secured. Although, three supplemental fuel lines are shown in the drawing figures, it is envisioned that a greater or fewer number of lines may be utilized. Each of the fuel lines is connected to a separate one of the nozzles 45 which are mounted through the openings in the front wall 39 of the housing 35. The nozzles are oriented generally angularly downwardly toward the ground so as to distribute an even series of flames to the area beneath the housing. As opposed to utilizing a plurality of nozzles, a single elongated header pipe could extend through the housing and include a plurality of orifices or fixed nozzles mounted thereto for purposes of creating a first burner assembly. When in use, the liquified petroleum passing through fuel line 46 from the fuel tank will become evaporated due to the heat exchange relationship of the serpentine portion of the fuel line with the housing.

Figure 5:
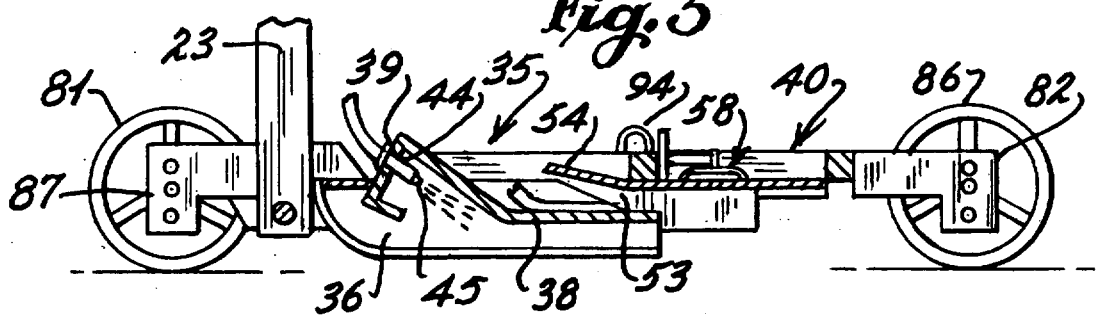
FIG. 5 is a cross-sectional view taken along line 5—5 of FIG. 4A.
Figure 6:
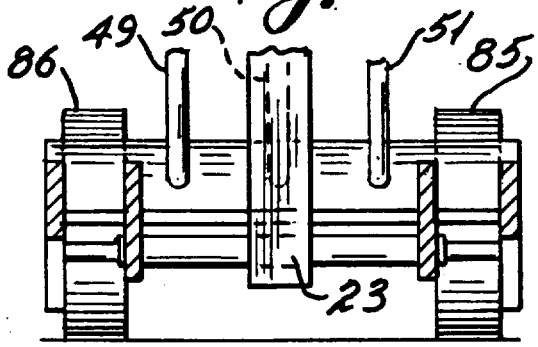
FIG. 6 is a cross-sectional view taken along line 6—6 of FIG. 4A.
Figure 7:
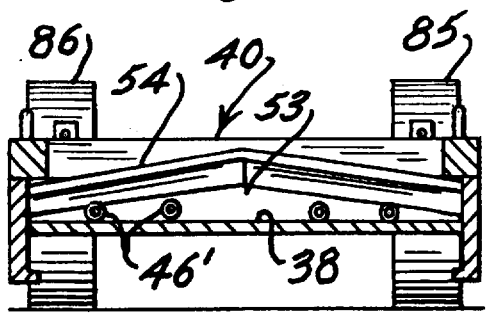
FIG. 7 is a cross-sectional view taken along line 7—7 of FIG. 4A.
Figure 8:
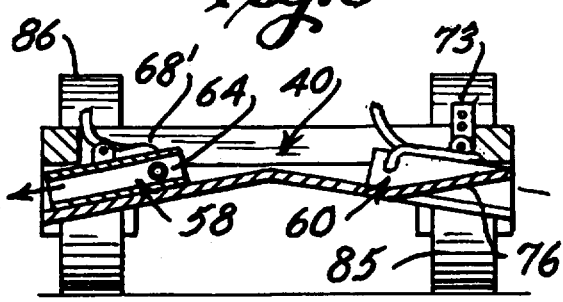
FIG. 8 is a cross-sectional view taken along line 8—8 of FIG. 4A.
Figure 9:
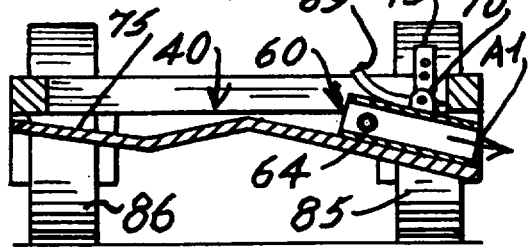
FIG. 9 is a cross-sectional view taken along line 9—9 of FIG. 4A.

As shown in the drawing figures, the flames from the first fuel nozzles 45 will be directed below the upper portions 37 and 38 of the housing 35 and between the side walls 36 thereof. In order to assure that flames and heat are retained beneath the carriage until being discharged from the rear portion thereof as well as to ensure sufficient oxygen to support combustion, an intake opening 53 is provided between the hood 40 and the housing 35. With particular reference to FIG. 5, the hood includes a front portion which is upwardly extended as shown at 54 and which is spaced above the upper portion 38 of the housing 35. This upper extending portion 54 will act as an air intake deflector which will channel ambient air through the opening 53 and direct air beneath the carriage toward the rear of the carriage. This flow of air prevents flames from escaping from the side of the housing and hood so that heat and any residual flames are directed to the rear of the carriage and released without causing damage to plants "P" in the adjacent crop rows "R", as shown in FIG. 3. Thus, all the heat energy is retained in the area above the furrow "F" between the crop rows thereby ensuring destruction of plant and insect life in these areas.

Figure 10:
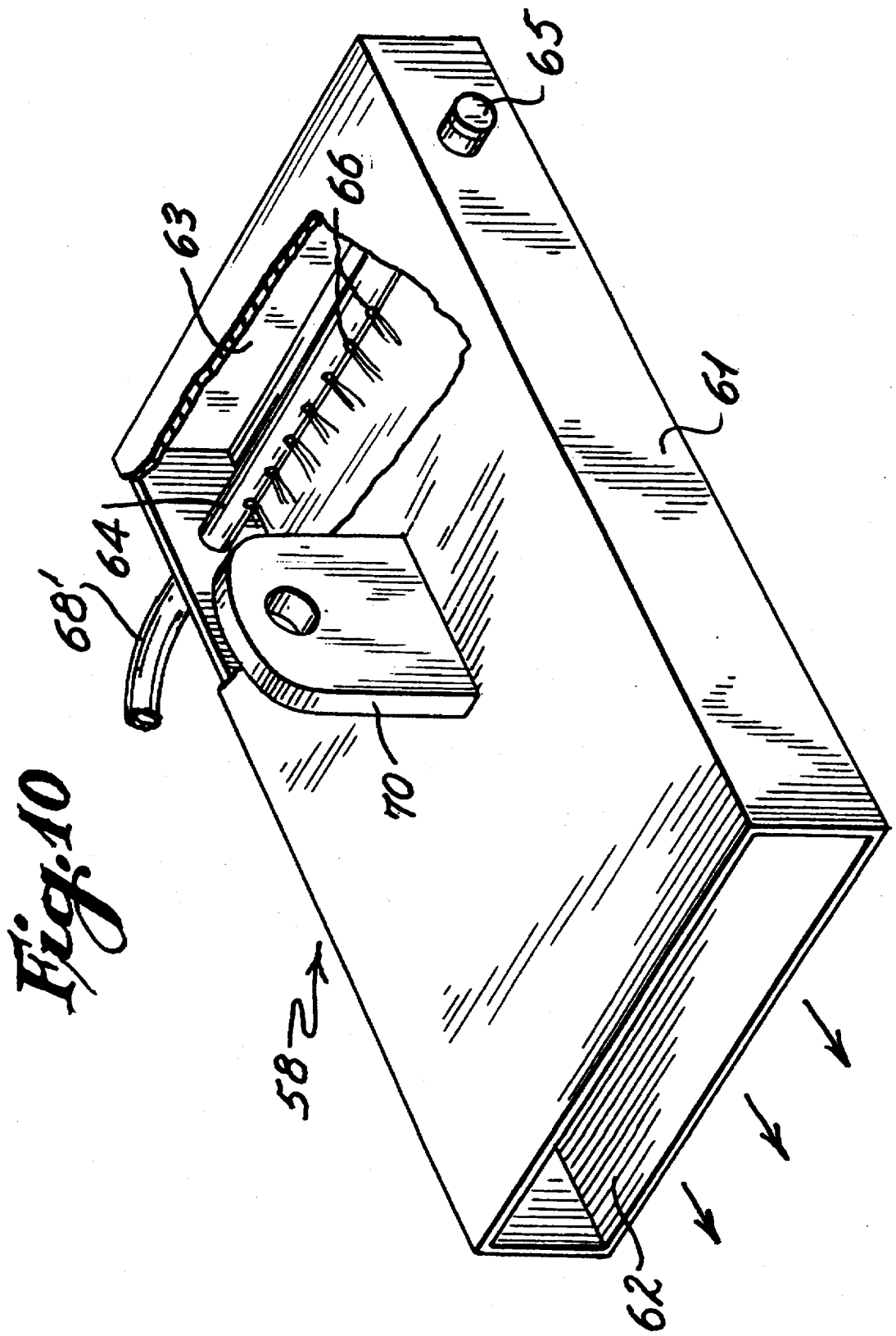
FIG. 10 is a perspective view of one of the side mounted burners of the present invention having portions broken away to show the interior of the burner.
Figure 11:
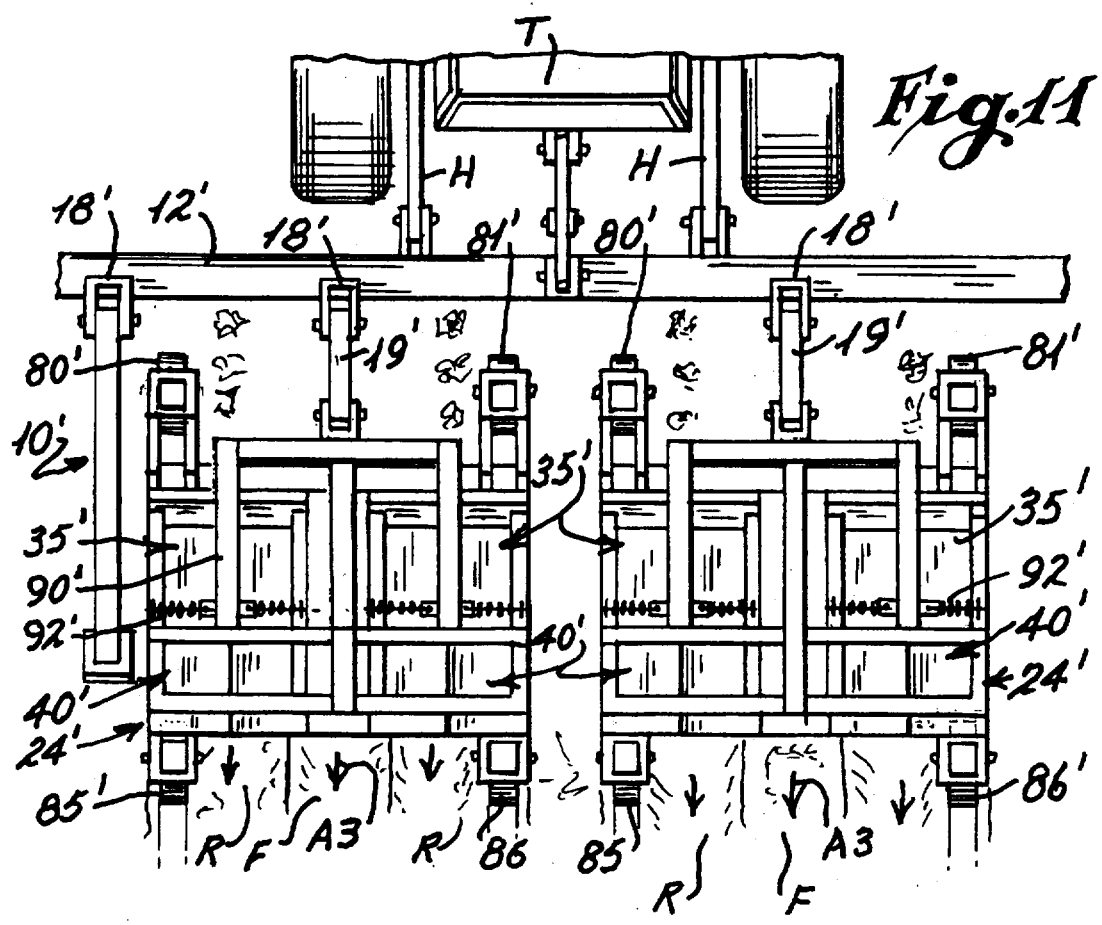
FIG. 11 is a top plan view of similar to FIG. 3 showing a different embodiment of the present invention wherein the burner units are designed to direct flame and heat directly to areas of the plant rows and furrows between the plant rows.
Figure 12:
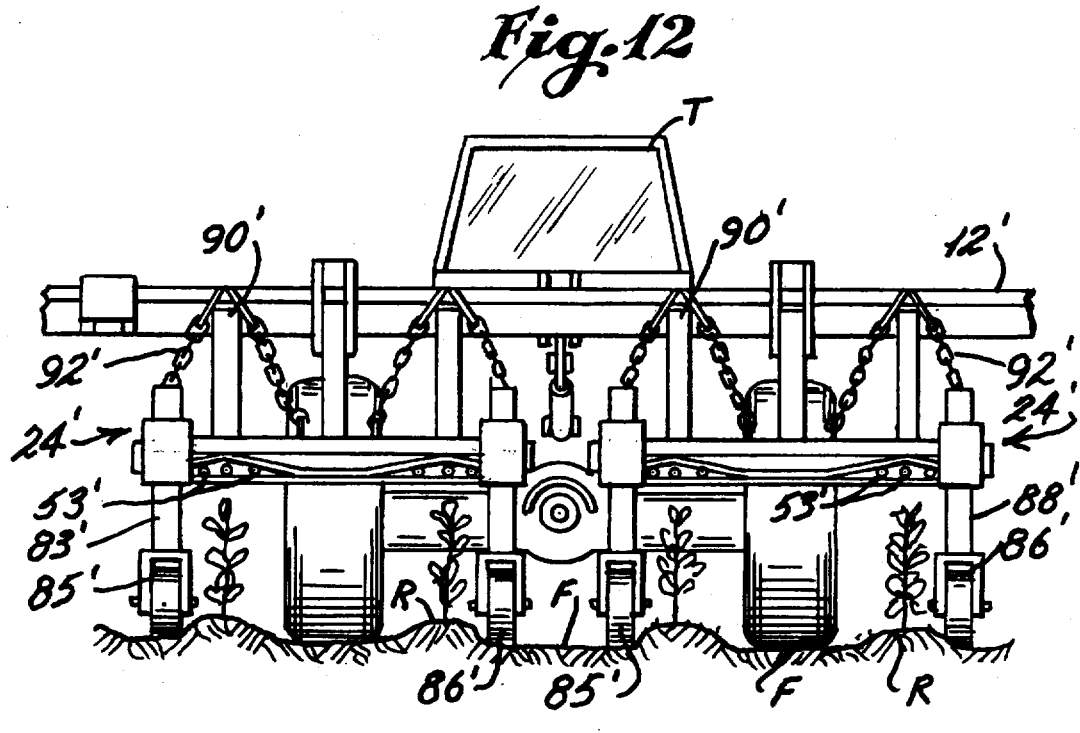
FIG. 12 is a rear view of the embodiment of FIG. 11 illustrating the positioning of the burner units with respect to the crop rows.
Figure 13:
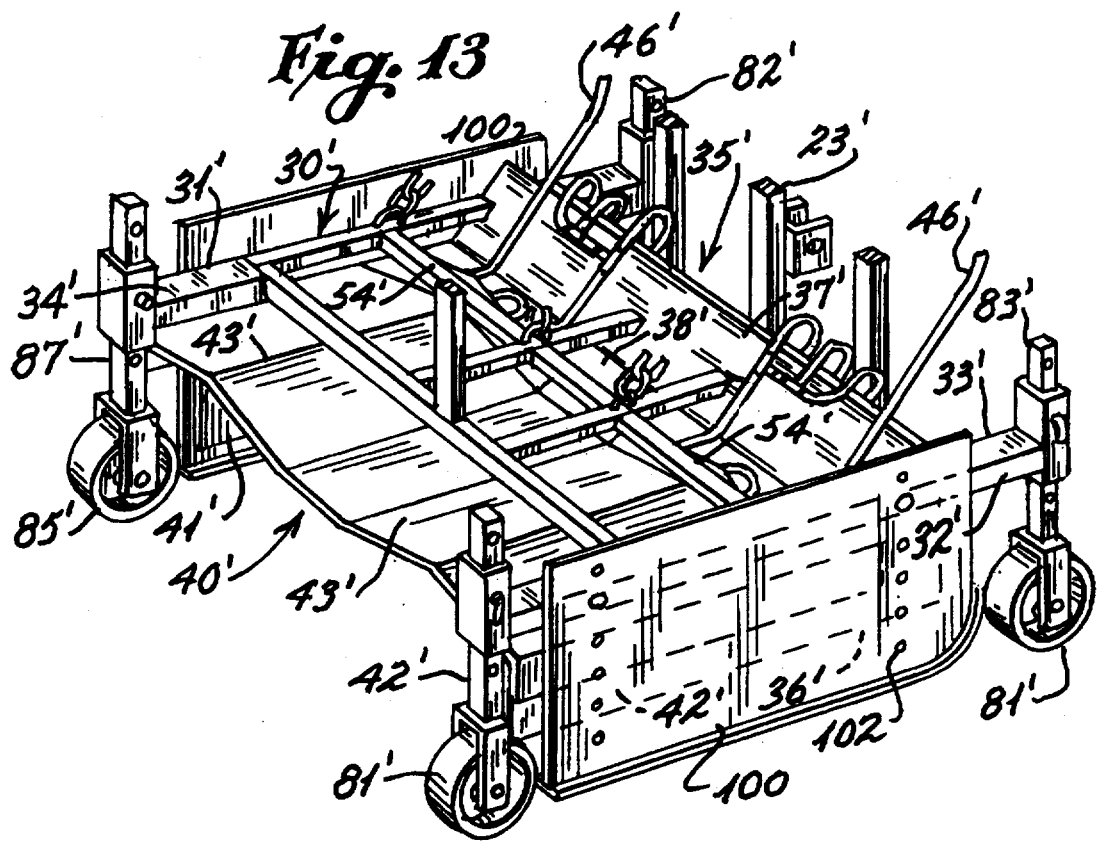
FIG. 13 is a perspective view of one of the burner units of FIG. 11.
Figure 14:
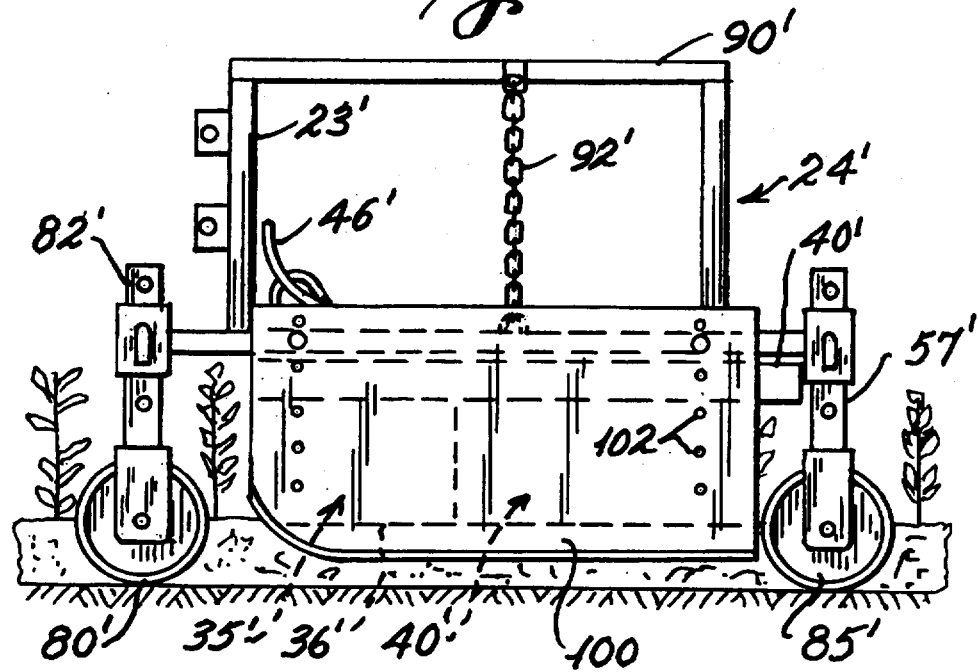
FIG. 14 is a side view of the burner unit of FIG. 13.

In order to destroy weeds, insect, micro-organisms and other elements at the base of the plants growing in the adjacent crop rows, the carriages of the embodiment of the present invention also support side oriented burners 58 and 60. The burners are mounted so as to be directed outwardly from each side 32 and 31, respectively, of the carriage frame and are mounted in off-set relationship with respect to one another, as shown from the top plan view in FIG. 4A. As shown in FIG. 10, each of the second and third burners 58 and 60 includes a generally elongated nozzle 61 which is open as shown at 62 in the front portion and also open at 63 in the rear portion. A discharge pipe 64 extends through the rear portion of the nozzle and is sealed at its outer end by a removable cap 65 which allows the pipe 64 to be cleaned. A plurality of spaced orifices 66 are mounted along the pipe 64 and serve as discharge orifices for gas which has been vaporized and delivered to each of the burners through fuel lines 68 and 69 which are connected at their opposite end portion with the valve 47 of the fuel tank 16. Each of the fuel lines 68 and 69 includes a coiled portion 68' and 69' which is mounted in heat exchange relationship along the upper surface of their respected nozzles so as to assist in evaporating the fuel being delivered to the discharge pipes 64.

Each burner 58 and 60 further includes a mounting bracket 70 having an opening therein by a way of which the nozzles are mounted to a support bracket assembly. With particular reference to FIG. 4, a pair of spaced brackets 72 and 73 are mounted to the carriage frame and are provided with a plurality of vertically spaced openings which allow the nozzles 58 and 60 to be vertically reoriented as is necessary. Connecting bolts 74 extend between each of the brackets 72 and 73 and the adjacent burners 58 and 60.

As generally shown by the arrows "A1" in FIG. 3, the carriages of the present embodiment of the invention are designed to allow the heat generated from the burners 58 and 60 to be trapped beneath the hood 40 of an adjacent carriage so that the heat can not adversely effect the foliage of the plants at which the nozzles are directed. The flames generate a sufficient air flow velocity so that the heat can be trapped underneath the hood of an adjacent carriage. To accomplish this, each of the hoods 40 includes a pair of off-set deflector plates 75 and 76 which extend upwardly to define openings 77 and 78 into the area beneath the hoods. It should be noted that deflector plate 75 is spaced immediately adjacent the burner nozzle 58 whereas deflector plate 76 is spaced slightly forwardly and adjacent to burner 60. In this manner, when the carriages are mounted to a common tool bar, the deflector plates 75 will define openings 77 which are aligned with an oppositely oriented burner 60 whereas the deflector plates 76 define openings 78 which are aligned with the burners 58. As flames are directed toward the base of the plants, the heat from the flames, after passing the base of the plants, will be contained beneath the hood 40 of an adjacent carriage and thereafter conveyed with the air flow through the opening 53 and the heat from the first burners 45 and discharged rearwardly of the implement, as shown by the arrow "A2" in FIG. 4.

With specific reference to FIG. 3, it should be noted that the carriage 24A on the left side of the drawing figure does not include any side burner unit 60 as there is no adjacent carriage to receive the excess heat that would be generated by an outer burner mounted to such a carriage. Likewise, the carriage 24A shown on the right side of the drawing figure does not include a burner 58.

One of the primary elements of this embodiment of the present invention is that the carriages are specifically designed to more closely track the terrain adjacent to the base of the plants "P" in a crop row "R". With specific reference to FIGS. 2 and 4, each of the carriages includes a pair of forward spaced wheels 80 and 81 which are mounted on a pair of outrigger members 82 and 83, respectively. Each of the outriggers includes a plurality of openings 84 therein which allow a vertical adjustment of the wheels with respect thereto. Likewise, rear wheels 85 and 86 are provided on rearwardly extending outriggers 87 and 88 and are also adjustable vertically with respect thereto. The wheels are preferably metal wheels formed having a generally wide contact area defining the circumference thereof. The wheels are designed and are spaced so as to ride along the side slope of the crop rows, as shown in FIG. 2, in vertically spaced relationship above the bottom of the furrows "F". Frequently, the furrows are irregular and often washed out or contain debris which, if a carriage was tracking in the bottom of the furrows, would cause the alignment of the side nozzles to be misdirected with respect to the plants "P" in adjacent crop row. By utilizing the wheels of the present invention, and correctly spacing the wheels with respect to the crop rows, the wheels will actually travel in the row material and thereby the carriages will track more closely with respect to the plants "P". In this manner, the implement provides a more uniform and even distribution of the flames from the side nozzles 58 and 60 than was possible with respect to prior art devices. By way of example, the carriages of this embodiment are designed so that the side burners 58 and 60 discharge at approximately 6 inches from the base of the plants "P" along the crop rows. This would normally require a spacing between the wheels of approximately 26 inches. Different spacings may be utilized and it is within the scope of the present invention that the frames, hoods and hood elements may be designed to be widened or collapsed so as to adapt the carriages for use in fields having varying spacings between the plant rows.

To further assist each of the burner carriages 24 and 24A to follow the ground contour, the carriages are allowed to float relative to the tool bar 12. As previously discussed, each carriage is connected by a post 23 and the pivotable linkage 19 to the tool bar 12. A supplemental support bar 90 is welded or otherwise secured to each of the posts 23 and extends inwardly thereof to a point generally along the mid-length of each of the carriages. A V-shaped plate 91 is welded to the bar 90 to which are mounted a pair of chains 92 and 93 which are connected to appropriate brackets 94 mounted on the opposite sides 31 and 32 of the frame.

In the use of the implement of the present embodiment, after the burners 45, and the side burners 58 and 60 have been ignited, the implement is driven through a field so that the carriages track in closely spaced relationship with respect to the base of the plants "P" in the crop row and at a point spaced above the bottom of the furrows between the crop rows. As the implement is moved between the crop rows, the heat generated from the first burners within the housings 35 will destroy the weeds, insects, microorganisms and other elements which are beneath the carriages with the flames and heat being retained by the housing 35 and hood 40 thus preventing damage to the adjacent foliage of the plants. Destruction of weeds, insects and other elements adjacent the base of the plants is accomplished by directing the flames from the burners 58 and 60 toward the base of the plants below the foliage. Excess heat will be trapped by passing through the openings created by the adjacent deflectors associated with the hoods of each carriage thereby preventing the heat from destroying the foliage above the base of the plants. As the implement is moved through the field, all heat will be discharged through the rear of each burner carriage at a point which is both spaced from the operator of the vehicle and at a point to prevent burning of adjacent plant foliage.

With particular reference to FIGS. 11–14, another embodiment of the present invention is disclosed in greater detail. In this embodiment, the burner implement 10' is specifically designed and constructed to simultaneously direct flame and heat to both the area of the furrows and the plant rows in order to destroy vegetation and insect life in those areas. As previously discussed, in some instances, such as in harvesting potatoes, it is preferred to destroy the potato vines prior to harvesting the potatoes. In these cases, the implement of the present invention may be utilized to destroy the vines prior to harvesting. The elements of this embodiment which are common to the elements of the previous embodiments will be referenced by the same number incorporating a prime ('). In this embodiment, the second and third burners utilized with the previous embodiments are not utilized. In this embodiment, all heat is directed beneath the housing and hood to ensure destruction of all foliage over which the implement passes.

As shown in FIG. 11–14, the burner implement 10' includes a tool bar 12' which is connected to the hitch assembly "H" of the track "T" in a manner as previously discussed. Although not shown in FIG. 11, the liquid petroleum tank 16 may be mounted on a frame above the tool bar or may be separately mounted to the tractor. A plurality of burner unit carriages 24' are mounted to the tool bar by parallel linkage members 19' which are pivotably connected to tool bar mounting brackets 18'. The opposite end of the linkage members 19' are pivotably connected to a post 23' which is connected to the frames 30' of each burner unit carriage.

Each frame 30' includes opposite side portions 31' and 32' and front and rear portions 33' and 34'. A housing 35' is mounted adjacent to the front portion of each carriage and includes opposite sidewalls 36' and first upper wall portion 37' which is tapered upwardly and a second generally horizontal wall portion 38' which extends rearwardly on the carriage. Extending from the housing 35' is a hood 40' which may be integrally formed with the housing 35' or separately formed and attached to the frame 30'. The hood includes depending sidewall portions 41' and 42' which extend from a pair of spaced upper ridges 43' Unlike the previous embodiment however, there are no openings provided in the sidewall portions of the hood. Further, as shown in drawing FIG. 12, the side portions 36' of the housing as well as the side portions 41' and 43' of the hood, extend downwardly a greater distance than with the previous embodiments. This is because, in this embodiment, the implement is designed to straddle one or more plant rows "R" and therefore the sidewalls of the housing and the hood must extend downwardly generally to the bottom of the furrow area "F" on opposite sides of a plant row "R". To further allow vertical adjustment of the side walls of the housing and hood, supplemental side plates 100 may be secured by suitable fasteners to the sidewalls. A plurality of vertically spaced openings 102 are provided in each plate to allow for selective adjustment.

In the embodiment shown, each carriage is of a sufficient width to straddle at least two plant rows "R". It should be noted, however, that the carriages may be designed to straddle a single or multiple rows and fall within the teachings of the present invention.

The housing also includes a tapered forward wall portion, similar to that shown in FIG. 5, having a plurality of openings therein through which a plurality of first burner nozzles, similar to those shown in FIG. 5, are oriented so as to direct flame downwardly and rearwardly relative to the carriage. It is preferred that the burner nozzles be equally spaced across the full width of the housing so as to uniformly distribute heat beneath the housing when the implement is in use.

A pair of primary fuel supply lines 46' extend from an appropriate valve assembly mounted to a source of fuel supply such as the fuel tank shown at 16 in the previous embodiment. Portions of the fuel lines engage the upper surface of the housing so as to be in heat exchange therewith whereby liquified petroleum may be vaporized as it passes toward the burner nozzles. Each primary fuel line is branched into secondary fuel lines to the burner nozzles.

As with the previous embodiments, air intake openings 53' are provided between the housing 35' and the hood 40'. In the embodiment shown, forward portions 54' of the hood extend above the adjacent portion 38' of the housing 35' and form deflectors for directing air downwardly and rearwardly toward the rear of the carriage. Air entering through the intake openings 53' will assure sufficient oxygen to promote combustion beneath the housing and the hood, especially when thick or massive vegetation is encountered which might otherwise choke the oxygen supply in the area beneath the carriages. The flow of the air direct rearwardly of the carriages will also ensure that the heat is retained for a significant period in contact with the vegetation and be the discharged rearwardly with respect to the carriages and, therefore, away from the vehicle operator, as is shown by the arrows A-3 in FIG. 11.

As the carriages 45' must be supported so as to straddle crop rows "R", each carriage includes vertically depending wheel mounting struts 82' and 83' and 87' and 88' to which wheels 80' and 81' and 85' and 86' are mounted, respectively. A plurality of openings are provided in each mounting strut so as to allow the selective vertical adjustment of the wheels relative to the main frame of the carriages. The struts extend downwardly so as to support the upper portion of the housing and the hood above the plant rows while the wheels are tracking in the furrows "F" between the plant rows. As previously discussed, the sides of the housing and the hood depend downwardly toward the base of the furrows.

The burner units 45' are permitted to float relative to the tool bar 12' and are suspended by sets of chains 92' from a supplemental support frame 90' connected to each post 23'.

As the implement 10' is maneuvered through a field, the flames and heat developed from the burners 45' will be trapped beneath the housing and hood thereby effectively destroying all vegetation and insect life over which the burner units pass.

I claim:

1. An agricultural burner implement for controlling weeds, insects, micro-organisms and other elements in the furrows and along spaced crop rows comprising; a plurality of burner units, each burner unit including a carriage means having opposite side portions and front and rear ends, each carriage means including a housing having upper and opposite side portions, each burner unit including first burner means mounted so as to direct a flame and heat within each of said housings, each carriage means having a hood for retaining heat created by each of said first burner means, each of said hoods extending from each of said housings toward each of said rear ends of said carriage means, each of said hoods having an upper portion and depending sidewall portions, each burner unit having an air intake opening for directing air rearwardly of each of said housings and beneath each of said upper portions of said hoods, means for mounting said plurality of burner units in substantially side-by-side and spaced relationship with respect to one another, each of said burner units including a second burner means mounted adjacent a first of said side portions of each of said carriage means which second burner means having a nozzle oriented generally toward a second of said side portions of an adjacent carriage means, and a third burner means mounted adjacent to said second of said side portions of each of said carriage means which third burner means having a nozzle oriented generally toward said first of said side portions of an adjacent carriage means, whereby, when said implement is conveyed through a field, flame and heat from each of said first burner means will be directed beneath each of said housings along the furrows while each of said second and third burner means will direct flame and heat outwardly toward the base of plants along the crop rows.

2. The agricultural burner implement of claim 1 in which each of said hoods includes a first deflector element extending above a first side opening beneath said hood adjacent to but spaced from said second burner means and a second deflector element extending above a second side opening beneath said hood adjacent to but spaced from said third burner means, and said first side opening being generally aligned opposite said third burner means of an adjacent carriage means and said second side opening being generally aligned opposite said second burner means of an adjacent carriage means.

3. The agricultural burner implement of claim 2 in which each of said carriage means includes a pair of spaced front wheels and a pair of spaced rear wheels, said front and rear wheels being spaced so as to support each of said carriage means on the crop rows and above the furrows.

4. The agricultural burner implement of claim 3 wherein each of said burner units includes a first fuel line extending from a source of fuel supply to said first burner means, said first fuel line having a portion contacting said housing so as to be in heat exchange relationship therewith, a second and third fuel lines extending from said source of fuel supply to said second and third burner means respectively, each of said second and third fuel lines having a portion thereof which engages said nozzles of said second and third burner means so as to be in heat exchange relationship therewith.

5. An agricultural burner implement for controlling weeds, insects, micro-organisms and other elements in the furrows and along spaced crop rows in which plants are growing comprising, a tool bar, a plurality of burner units, means for connecting each of said burner units in spaced relationship to one another to said tool bar, each of said burner units including a carriage means having opposite side portions and front and rear ends, each carriage means having a housing having upper and opposite side portions and a hood extending from said housing toward said rear end thereof, a first burner means mounted within said housing, a second burner means mounted adjacent a first of said side portions of said carriage means and having a nozzle oriented generally toward a second of said side portions of an adjacent carriage means, a third burner means mounted adjacent to said second of said side portions and having a nozzle oriented generally toward said first side portion of an adjacent carriage means, whereby when said implement is conveyed through a field, flame and heat from said first burner means within said housing will be directed along the furrows while the second and third burner means will direct flame and heat toward the base of plants along the crop rows.

6. The agricultural burner implement of claim 5 in which each of said carriage means includes an air intake opening spaced above a portion of said upper portion of said housing and communicating so as to direct air below said hood.

7. The agricultural burner implement of claim 6 in which said hood includes a forward portion which extends above said portion of said upper portion of said housing, said air intake opening being formed between said forward portion of said hood and said housing.

8. The agricultural burner implement of claim 6 in which said hood includes a first deflector element extending above a first side opening beneath said hood adjacent to but spaced, from said second burner means and a second deflector element extending above a second side opening beneath said hood adjacent to but spaced from said third burner means, and said first side opening being generally aligned opposite said third burner means of an adjacent carriage means and said second side opening being generally aligned opposite said second burner means of an adjacent carriage means.

9. The agricultural burner implement of claim 8 in which each of said carriage means includes a pair of spaced wheels and a pair of spaced rear wheels, said front and rear wheels being spaced so as to support each of said carriage means on the crop rows and above the furrows.

10. The agricultural burner implement of claim 9 including a first fuel line extending from a source of fuel supply to said first burner means, said first fuel line having a portion contacting said housing so as to be in heat exchange relationship therewith.

11. The agricultural burner implement of claim 10 including second and third fuel lines extending from said source of fuel supply to said second and third burner means respectively, each of said second and third fuel lines having a portion which engages said nozzles of said second and third burner means so as to be in heat exchange relationship therewith.

12. The agricultural burner implement of claim 11 in which said nozzles of each of said second and third burner means include open front and rear ends, a pipe extending across said nozzles adjacent said open rear ends thereof, said pipe being connected to each of said second and third fuel lines, respectively, and a plurality of openings in said pipe.

13. The agricultural burner implement of claim 5 in which each of said carriage means includes a pair of spaced front wheels and a pair of spaced rear wheels, said front and rear wheels being spaced so as to support each of said carriage means on the crop rows and above the furrows.

14. An agricultural burner implement for controlling weeds, insects, micro-organisms and other elements in the furrows and along spaced crop rows in which plants are growing comprising, a burner unit including a carriage means having opposite side portions and front and rear ends, said carriage means having a housing having upper and side portions, a first burner means mounted within said housing, a second burner means mounted adjacent a first of said side portions of said carriage means and having a nozzle oriented outwardly therefrom, a third burner means mounted adjacent to a second of said side portions of said carriage means and having a nozzle oriented outwardly therefrom, a hood for retaining heat created by said first burner means, said hood extending from said housing toward said rear end of said carriage means, an air intake opening for directing air beneath said hood toward said rear end of said carriage means, whereby when said implement is conveyed through a field, flame and heat from said first burner means within said housing will be directed along the furrows while the second and third burner means will direct flame and heat toward the base of plants along the crop rows.

15. The agricultural burner implement of claim 14 in which said hood includes opposite depending side portions, a first deflector element extending above a first side opening in one of said side portions of said hood and a second deflector element extending above a second side opening in the other of said side portions of said hood.

16. The agricultural burner implement of claim 15 in which said carriage means includes a pair of spaced front wheels and a pair of spaced rear wheels, said front and rear wheels being spaced so as to support said carriage means on the crop rows and above the furrows.

17. An agricultural burner implement for controlling weeds and insects in the furrows and along spaced crop rows in which plants are growing comprising, a plurality of burner units, means for connecting each of said burner units in spaced side-by-side relationship relative to one another, each of said burner units including a carriage means having opposite side portions and front and rear ends and a housing having upper and side portions, a hood extending from said housing toward said rear end of said carriage means and having depending side portions, a first burner means mounted within said housing, at least one side oriented burner means mounted adjacent one of said side portions of said carriage means and having a nozzle oriented generally toward one of said side portions of an adjacent carriage means, whereby when said implement is conveyed through a field, flame and heat from said first burner means within said housing will be directed along the furrows while said at least one side oriented burner means will direct flame and heat toward the base of plants along a crop row.

18. The agricultural burner implement of claim 17 in which said hood includes at least one side opening and said side opening being generally aligned opposite said at least one side oriented burner means of an adjacent carriage means.

19. The agricultural burner implement of claim 18 including an air deflector means creating an air intake opening for directing air beneath said hood and toward said rear end of said carriage means.

20. The agriculture implement of claim 19 in which said carriage means includes a pair of spaced front wheels and a pair of spaced rear wheels, said front and rear wheels being spaced so as to support said carriage means on the crop rows and above the furrows.

* * * * *